(12) United States Patent
Varghese et al.

(10) Patent No.: US 11,132,719 B2
(45) Date of Patent: Sep. 28, 2021

(54) REAL-TIME FEEDBACK OF ADVERTISEMENT REVIEW

(71) Applicant: Facebook, Inc., Menlo Park, CA (US)

(72) Inventors: Mathew Varghese, Los Altos, CA (US); Nuwan Senaratna, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 914 days.

(21) Appl. No.: 13/756,360

(22) Filed: Jan. 31, 2013

(65) Prior Publication Data

US 2014/0214558 A1 Jul. 31, 2014

(51) Int. Cl.
*G06Q 30/02* (2012.01)

(52) U.S. Cl.
CPC .................. *G06Q 30/0277* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 6,981,214 B1* | 12/2005 | Miller | ................... | G06F 3/1267 715/234 |
| 7,136,177 B1* | 11/2006 | Bryan | ................ | G06Q 30/0269 358/1.15 |
| 8,583,488 B2* | 11/2013 | Janos | ................ | G06Q 30/0225 705/14.72 |
| 8,639,544 B1* | 1/2014 | Flemma, Jr. | ........ | G06Q 30/0241 705/7.11 |
| 9,009,834 B1* | 4/2015 | Ren | ..................... | G06F 21/6209 726/24 |
| 2004/0073484 A1* | 4/2004 | Camporeale | ........... | G06Q 30/02 705/14.4 |
| 2005/0222902 A1* | 10/2005 | Coit | ................... | G06Q 30/0263 705/14.6 |
| 2006/0149623 A1* | 7/2006 | Badros | ................... | G06Q 30/02 705/14.66 |
| 2007/0005418 A1* | 1/2007 | Nishar | ................... | G06Q 30/02 705/14.46 |
| 2007/0214045 A1* | 9/2007 | Subramanian | ..... | G06Q 30/0273 705/80 |
| 2008/0300971 A1* | 12/2008 | Zeng | ................... | G06Q 30/0254 705/14.41 |
| 2009/0063229 A1* | 3/2009 | Coladonato | ............ | G06Q 30/02 705/14.44 |
| 2009/0076901 A1* | 3/2009 | Janos | ................. | G06Q 30/0225 705/14.26 |
| 2009/0163186 A1* | 6/2009 | Gupta | .................... | G06Q 30/02 455/414.2 |

(Continued)

*Primary Examiner* — Gautam Ubale
(74) *Attorney, Agent, or Firm* — Fenwick & West LLP (57) ABSTRACT

As components of an advertisement are received by an online system, the online system determines whether the received components satisfy one or more policies of the online system. If a component does not satisfy a policy of the online system, the user providing the components is notified when the component is provided, allowing the user to modify the component. Additionally, stored data describing previously analyzed components are compared to received components, and the stored data is used if the received component matches a previously analyzed component This process expedites approval of advertisements by the online system.

17 Claims, 3 Drawing Sheets

(56) References Cited

U.S. PATENT DOCUMENTS

| | | | |
|---|---|---|---|
| 2009/0303676 A1* | 12/2009 | Behar | G06F 16/9577 361/679.27 |
| 2010/0125523 A1* | 5/2010 | Solomon | G06Q 10/10 705/51 |
| 2010/0145762 A1* | 6/2010 | Coladonato | G06Q 30/0241 705/14.4 |
| 2010/0274624 A1* | 10/2010 | Rochford | G06Q 30/0269 705/14.41 |
| 2010/0280876 A1* | 11/2010 | Bowra | H04N 21/262 705/14.41 |
| 2010/0287052 A1* | 11/2010 | Minter | G06Q 30/0269 705/14.64 |
| 2010/0306249 A1* | 12/2010 | Hill | G06Q 50/01 707/769 |
| 2011/0082824 A1* | 4/2011 | Allison | G06N 20/00 706/20 |
| 2011/0106622 A1* | 5/2011 | Kuhlman | G06Q 30/0267 705/14.53 |
| 2012/0078709 A1* | 3/2012 | Dunham | G06Q 30/0243 705/14.42 |
| 2012/0123858 A1* | 5/2012 | Rosenthal | G06Q 30/0251 705/14.49 |
| 2012/0203623 A1* | 8/2012 | Sethi | G06Q 30/0241 705/14.43 |
| 2013/0124447 A1* | 5/2013 | Badros | G06Q 30/0251 706/52 |
| 2013/0151346 A1* | 6/2013 | Schoen | G06Q 30/02 705/14.66 |
| 2013/0152125 A1* | 6/2013 | Xiong | H04N 21/25891 725/34 |
| 2013/0263166 A1* | 10/2013 | Fleischman | G06Q 50/01 725/14 |
| 2013/0317904 A1* | 11/2013 | Tan | G06Q 30/0248 705/14.47 |
| 2014/0052540 A1* | 2/2014 | Rajaram | G06Q 30/0255 705/14.66 |
| 2014/0180835 A1* | 6/2014 | Bitran | G06F 21/6209 705/14.73 |

* cited by examiner

REAL-TIME FEEDBACK OF ADVERTISEMENT REVIEW

BACKGROUND

This invention relates to online systems and in particular to reviewing advertisements and providing feedback about the advertisements in an online system.

A large number of online systems derive revenue by showing advertisements to their users. Advertisements allow advertisers, or other providers, to obtain public attention to their products, services, opinions, or causes. Presenting advertisements allows advertisers to persuade persons viewing the advertisement to respond in a certain way to advertised products, services, or other information. Providers advertising their products, services, opinions, or causes in the online system may manually create an advertisement through a web page provided by the online system or automatically create an advertisement through an application programming interface (API).

As the online system grows and the number of users that visit the online system increases, the number of providers trying to advertise their products in the online system also increases. Additionally, online systems often specify certain policies for advertisements to comply with before being presented by the online system. Manual review of advertisements for compliance with online system policies is a time consuming process that is not scalable as the number of providers promoting their products increases. Additionally, manual review of advertisements may lead to inconsistencies in review as reviewers may have different views regarding compliance of an advertisement.

Another problem with manual reviews is that advertisers do not know the likelihood a newly created advertisement will be approved. Accordingly, a large number of newly created advertisements are submitted for review with a high probability or rejection. Many rejected advertisements are modified and re-submitted multiple times, further increasing the number of reviews by the online system.

SUMMARY

An online system generates revenue by presenting advertisements to its users. To enhance user experiences, advertisements presented by the online system are often limited to advertisements satisfying certain requirements. Reviewing the advertisements for compliance of the different requirements and policies can be a time consuming process. Conventional online systems manually review advertisements, so depending on the complexity of the advertisement and the backlog of the reviewers, approval of an advertisement may take anywhere from a few hours to a few days. This may result in lower revenues for the online system.

Embodiments of the invention divide new advertisements into components and separately review each component of an advertisement. Analyzed components are stored in a database or a repository. When reviewing a component of an advertisement, the online system accesses the database to determine if the component, or a similar component, has been reviewed. If a component matches a previously reviewed component, the online system uses the results of the previous review of the component rather than reviewing the component. Because advertisements often include overlapping components, reusing previous reviews of a component reduces the amount of time and number of reviews to approve or reject advertisements.

In one embodiment, the online system stores previously reviewed components analyzed using complex processes; for example, image processing may be complex and time consuming, so results of reviews of images are stored. As an example, determining that an image references alcoholic beverages is difficult and may consume significant computational resources if reviewed multiple times. However, a title is usually short and conveys a clear message, so limited computational resources are used to analyze a title. Hence, storing results of image analysis provides a savings in the time for analyzing an advertisement while storing results of analysis of a title provides limited, if any, reduction in advertisement analysis time. Hence, analyzing components of advertisements and storing the results of the analysis expedites approval of advertisements and results in a more consistent advertisement review process.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An online system reviews advertisements against one or more policies. The advertisement review breaks advertisements ("ads") into components (e.g., title, content, image, landing page, etc.). Each component, rather than the entire ad, is then reviewed. A signature is computed for each component and stored. Subsequently received advertisements are broken into components which are compared to the stored signatures to determine if the component was previously reviewed. This allows the online system to provide an advertiser with real-time feedback about different components of the advertisement during advertisement creation, allowing the advertiser to revise the advertisement as it is created to avoid submitting an advertisement that will be rejected. For example, if the advertisement is violating a policy, the user is notified before submitting the advertisement for review by the online system. Furthermore, the online system may also provide recommendations for improving advertisement quality during creation. For example, the online system may recommend modifications of the advertisement components to improve its effectiveness.

By providing real-time reviews, advertisements in the online system can be more quickly approved and presented by the online system. This benefits time sensitive advertisements, such as those identifying special deals with expiration dates. Additionally, this component by component review reduces revenue lost by the online system caused by delays in advertisement reviews.

AD Review System Environment

Figure 1:
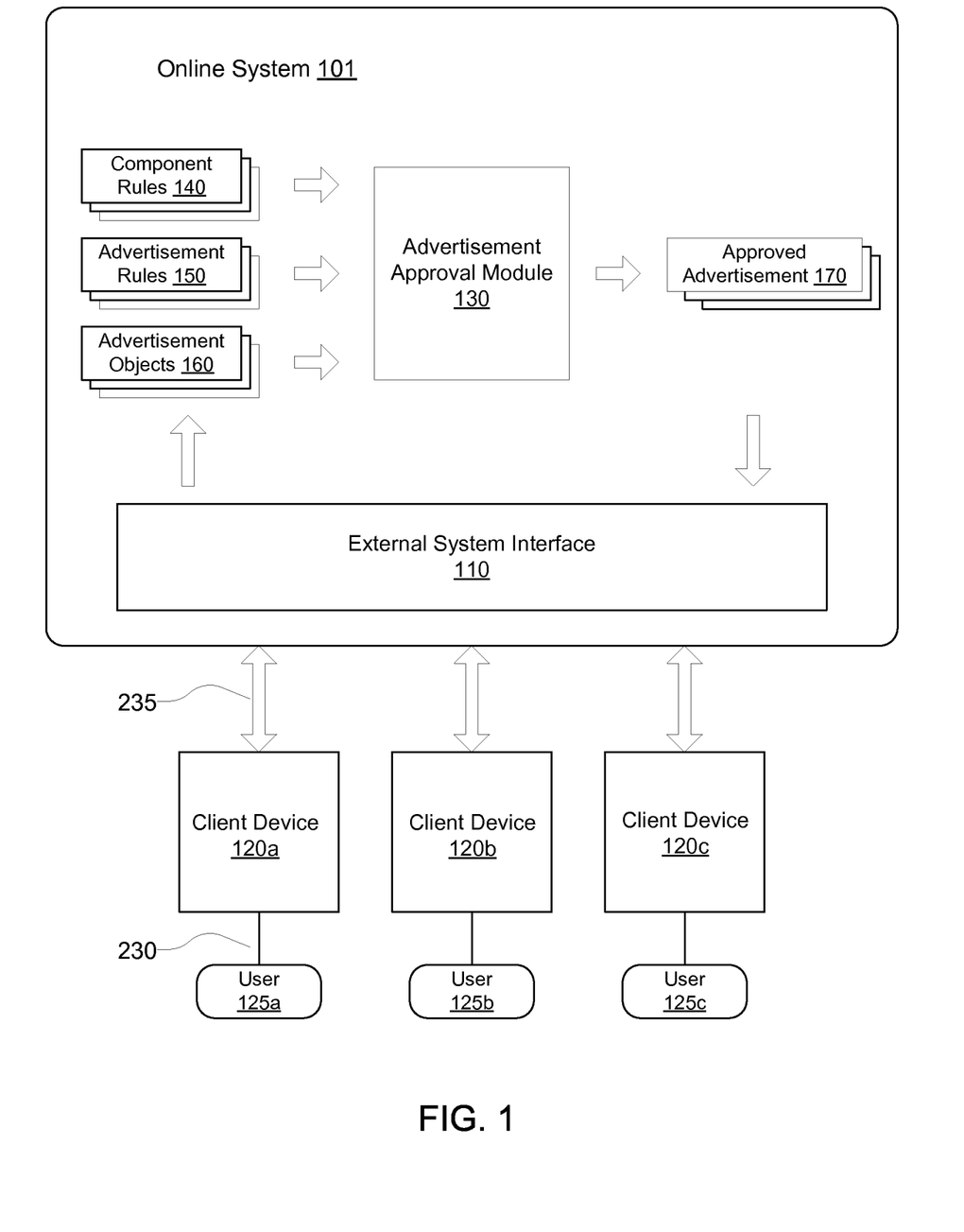
FIG. 1 is a diagram of a system environment for approving advertisements in an online system, in accordance with an embodiment of the invention.

FIG. 1 is a diagram of one embodiment of a system environment for approving advertisements in an online system. FIG. 1 and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g., "120" in the text refers to reference numerals "120A" and/or "120B" in the figures).

Users 125a, 125b, 125c interact with the online system 101 using client devices 120a, 120b, 120c. A client device 120 used by a user 125 to interact with the online system 101 may be any computing device having data processing and data communication capabilities. Examples of client devices 120 include a desktop computer, a laptop computer, a notebook, a tablet computer, a smart phone, a personal digital assistant (PDA), or other suitable computing device.

In one embodiment, the online system 101 includes an external system interface 110 for transmitting and receiving data between the online system 101 and one or more client devices 120. The online system 101 maintains different types of objects representing data used for advertisement creation. Examples of objects maintained by the online system 101 include component rules 140, advertisement rules 150, advertisement objects 160, and approved advertisement objects 170. A component rule object 140 stores information describing how to identify one or more components of an advertisement and determining whether a component satisfies one or more policies of the online system 101. An advertisement rule object 150 stores information describing criteria for determining whether an advertisement satisfies one or more policies of the online system 101 based on whether components of the advertisement satisfy one or more policies of the online system 101. The advertisement objects 160 store information describing advertisements provided to the online system 101 form one or more advertisers. An approved advertisement object 170 stores information describing characteristics of an advertisement determined to satisfy at least a threshold number of policies of the online system 101 by an advertisement approval module 130. These objects are further described in detail herein. The online system 101 is further described below in conjunction with FIG. 2.

Online System Architecture

Figure 2:
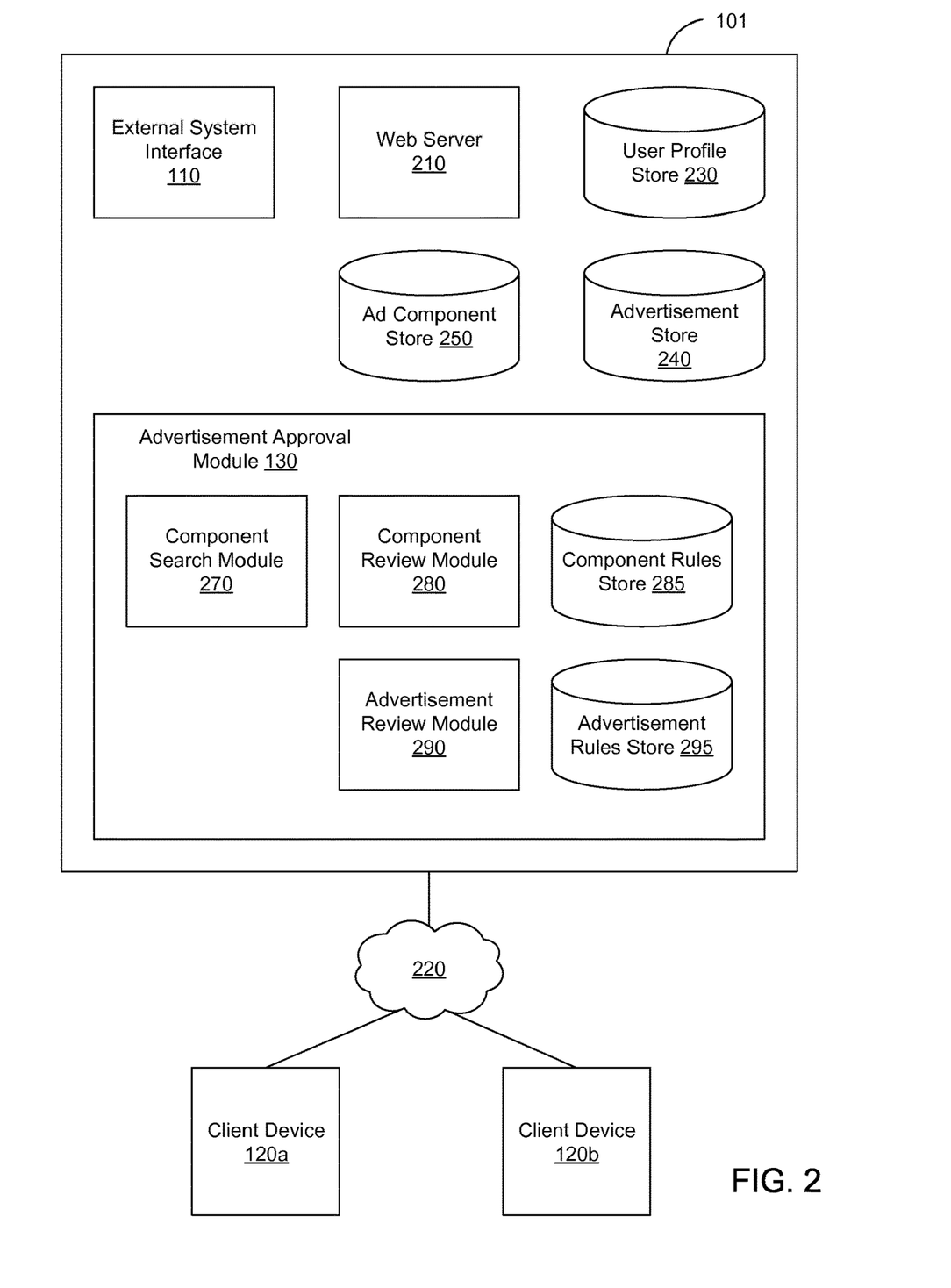
FIG. 2 is a diagram of a system architecture of an online system for approving advertisements, in accordance with an embodiment of the invention.

FIG. 2 is a block diagram of one embodiment of a system architecture of an online system 101 for approving advertisements. In the embodiment shown by FIG. 2, the online system 101 includes a web server 210, an external system interface 110, a user profile store 230, an advertisement store 240, an ad component store 250, and an advertisement approval module 130. In other embodiments, the online system 101 may include additional, fewer, or different modules for various applications. Conventional components such as network interfaces, security mechanisms, load balancers, failover servers, management and network operations consoles, and the like are not shown so as to not obscure the details of the system.

The online system 101 allows users to communicate or otherwise interact with each other and access content. The online system 101 stores user profile objects in the user profile store 230. Information stored in user profile store 230 describes the users of the online system 101, including biographic, demographic, and other types of descriptive information, such as work experience, educational history, gender, sexual preferences, hobbies or preferences, location, and the like.

The web server 210 links the online system 101 via a network 220 to one or more client devices 120; the web server 210 serves web pages, as well as other web-related content, such as JAVA®, FLASH®, XML, and so forth. The web server 210 receives and routes messages between the online system 101 and the client devices 210. These messages may be instant messages, queued messages (e.g., email), text and SMS (short message service) messages, or any other suitable messaging technique.

Interactions between the client devices 120 and the online system 101 are typically performed via a network 220. In one embodiment, the network 220 uses standard communications technologies and/or protocols. Thus, the network 220 can include communication channels using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Examples of networking protocols used on the network 220 include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 220 may be represented using technologies and/or formats including hypertext markup language (HTML), extensible markup language (XML), etc. In addition, all or some of the communication channels may be encrypted using conventional encryption technologies such as secure sockets layer (SSL), transport layer security (TLS), virtual private networks (VPNs), Internet Protocol security (IPsec), etc. In another embodiment, custom and/or dedicated data communication technologies may be used in addition to, or instead of, those described above. Depending upon the embodiment, the network 220 may also include links to other networks such as the Internet.

The advertisement store 240 of the online system 101 stores information describing advertisements, for example, advertisements represented as advertisement objects 160. Each advertisement object 160 is associated with a user account. An advertisement object 160 may be manually created through an interface provided by the online system 101. Alternatively, one or more advertisement objects 106 may be created using application programming interface (API). After an advertisement object 160 is created, it is reviewed before being presented to other users of the online system 101. In some embodiments, the advertisement store 240 stores advertisement objects 160 satisfying one or more policies of the online system 101 and removes expired and/or rejected advertisement objects 160. Other embodiments maintain advertisement objects 160 in the advertisement store 240 even if advertisement objects 160 do not satisfy one or more policies of the online system 101 or are expired.

The advertisement ("ad") component store 250 stores signatures describing advertisement components compared to one or more policies of the online system 101. The ad component store 250 also stores information indicating whether an advertisement component satisfies one or more policies of the online system 101, such as the results of analysis of an advertisement component by the advertisement approval module 130. In some embodiments, the ad component store 250 stores the entire component and whether the component satisfies one or more policies of the online system 101. Other embodiments store a representation of the components such as a hash or a signature describing a component.

The advertisement approval module 130 approves or rejects advertisement objects 160 based on whether components of an advertisement object 160 satisfy one or more policies of the online system 101. The advertisement approval module 130 includes a component search module 270, a component review module 280, a component rules store 285, an advertisement review module 290, and an advertisement rules store 295. Details of the advertisement approval module 130 are further described herein.

Advertisement Component Search

When a component of an advertisement object 160 is identified, the component search module 270 determines whether the ad component store 250 includes data indicating whether a component from another advertisement matching, or similar to, the component satisfies one or more policies of the online system 101. If a match is found, the advertisement approval module 130 retrieves the data associated with the matching or similar component and uses the data associated with the matching or similar component to indicate whether the component satisfies one or more policies of the online system 101. The component search module 270 may use different processes to determine the similarity between two components. For example, a threshold level of similarity may be specified so that a stored components having at least a threshold similarity to a component, but not fully matching the component, is identified as a match for the component For example, whether a color image satisfies one or more policies of the online system 101 may be used to indicate whether a black and white image having the same content satisfies one or more policies of the online system 101.

The component search module 270 may use different processes for identifying stored components based on a type of a component. For example, to determine if the text of two advertisements are equivalent, keyword matching may be used. In one embodiment, the component search module 270 may require both texts to have the exact same words. In another embodiment, the component search module 270 identifies a stored component having at least a threshold number of words in common with a component.

To determine if a component of an advertisement object 160 specifying a landing page matches a landing page of another advertisement, the component search module 270 may compare the uniform resource locators (URLs) of the landing pages. If the URLs specify the same web page, web site, or other network destination, the component specifying the landing page is determined to match the landing page of the other advertisement. In some embodiments, the component search module 270 determines whether the domain names of the different landing pages match, and identifies landing pages as matching if the domain names match. For example, the landing pages "domain1.com/index.html" and "domain1.com/default.asp" are determined to match because both have the domain name "domain1.com." In other embodiments, the component search module 270 may access different landing pages to determine if the content of the landing pages is similar or matching.

A component of an advertisement object 160 may be an image presented when an advertisement is displayed. To determine whether an image component matches a stored image component, a signature or hash may be generated and compared to a database of image signatures or hashes. In one embodiment, similar images are assigned similar hashes. Hence, if the difference between the hashes of two images is below a threshold, the component search module 270 determines that the two images are match. In other embodiments one or more image processing methods are used to determine if two images are match.

In one embodiment, the component search module 270 searches components previously analyzed using complex processes. As an example, determining that an image references alcoholic beverages is difficult and may consume significant computational resources if reviewed multiple times. However, a title is usually short and conveys a clear message, so limited computational resources are used to analyze a title. Hence, storing results of image analysis provides a savings in the time for analyzing an advertisement while storing results of analysis of a title provides limited, if any, reduction in advertisement analysis time. Hence, analyzing components of advertisements and storing the results of the analysis expedites approval of advertisements and results in a more consistent advertisement review process.

Advertisement Component Analysis

The component review module 280 identifies components of an advertisement. In some embodiments, the component review module 280 assigns tags from a pre-determined list of tags or "ground truths" stored in the component rule store 285. Tags describe content features or attributes of the advertisement components. Hence, the tags describe characteristics of components of an advertisement. For example, an image including a picture of a beer mug may be tagged as "Alcohol Reference."

In some embodiments, tags are policy independent. As tags describe a component and do not specify whether a component satisfies a policy of the online system 101, if a policy changes, the tags associated with an advertisement object 160 may remain unchanged. For example, if a policy in the online system 101 specifying rejection of advertisements related to paintball is removed, components identified as related to paintball remain tagged as "Paintball Reference." When the advertisement approval module 130 reviews an advertisement object 160, the advertisement object 160 is not rejected for having the "Paintball Reference" tag, despite being rejected for having the "Paintball Reference" tag before the policy was removed.

In some embodiments, if analysis of a component is complex or if the component review module 280 determines the component needs further review, the component review module 280 may suggest manual review of the component. In one embodiment, the component review module 280 assigns a special tag, such as a "Needs More Review" tag to a component to be further reviewed. In some embodiments, tags associated with a component by a human reviewer are differentiated from tags assigned to the component by the component review module 280. For example if an image contains an alcohol reference, the component review module 280 assigns the component a "GT_ALCOHOL_REFERENCE" tag and the human reviewer assigns the component a "REP_ALCOHOL_REFERENCE" tag.

In some embodiments, if the component review module 280 identifies a component for manual review, the component is sent to multiple human reviewers (e.g., five reviewers) instead of a single human reviewer. In one embodiment, a tag is associated with a component if at least a threshold number or percentage of the reviewers assign the tag to the component. For example, if four out of five reviewers tag an image as "Suitable for All" and a single reviewer tags the image as "Revealing Body Parts," the image is assigned a tag of "Suitable for All." In another embodiment, the threshold number or percentage of reviewers to assign a tag to a component may vary depending on the type of tag. Each tag may have a different threshold number or percentage depending on a risk factor associated with the tag. For example, if five reviewers analyze a component, the component review module 280 may assign a tag to a component having a medium risk factor if two of the five reviewers assign the tag to the component and may assign a tag to a component having a high risk factor if a single reviewer assigns the tag to the component.

In some embodiments, if a human reviewer cannot determine which tag is the most appropriate for a component, the component review module 280 assigns a tag requesting generation of a new tag. For example, a "REP_NEED_BAD_TAG" tag may be associated with a component for which a tag cannot be identified. In one embodiment, the component review module 280 periodically reviews stored components associated with a "REP_NEED_BAD_TAG" tag to determine whether to create new tags.

Advertisement Analysis

After component review module 280 identifies characteristics of different components of an advertisement object 160, the advertisement review module 290 determines whether the advertisement object 160 satisfies one or more policies of the online system 101 based on the characteristics of the components. In some embodiments the advertisement review module 290 rejects an advertisement object 160 if any of its components is associated with a tag included on a blacklist. In other embodiments, an advertisement object 160 is rejected if at least a threshold number of components are associated with tags included on a blacklist.

In another embodiment, the advertisement review module 290 performs a more complex analysis based on multiple characteristics of components of an advertisement object 160. For example, the advertisement review module 290 rejects an advertisement including an image tagged as "Alcohol Reference" and includes a target audience of "All." However, if another advertisement includes an "Alcohol Reference" tagged image and the target audience is identified as "Over 21," the advertisement is determined to satisfy a policy of the online system 101. In another embodiment, the advertisement review module 290 approves advertisement including an auto-approve tag associated with a component, regardless of tags associated with other components of the advertisement.

In some embodiments, if an advertisement is rejected, the advertisement approval module 130 sends a message notifying the user or advertiser creating the advertisement that the advertisement does not satisfy a policy of the online system 101. For example, a disapproval email describing the reasons for rejection of the advertisement and the policies the advertisement did not satisfy is sent to an advertiser. The disapproval email may also include a list of tags assigned to each component and suggestions for improving the advertisement.

Real-Time Advertisement Analysis

For advertisements that are manually created, the component review module 280 analyzes components of the advertisement as the components are specified by the user using an advertisement submission interface. The advertisement submission interface may include multiple fields for the user to provide various components of the advertisement. As used herein "advertisement" may refer to the components of an advertisement as well as information determining presentation of the advertisement, such as targeting criteria. For example, as the user types the title of the advertisement, the component review module 280 analyzes the words provided to the user to determine if one or more of the words do not comply with a policy of the online system 101. In one embodiment, the component review module 280 waits until the user provides complete information for a component before reviewing the component. The component review module 280 may determine that the user has provided information for a component when user switches fields in an interface (e.g., the user selects a body field from the interface rather than a title field) or when the user does not provide information for at least a threshold amount of time. If the user modifies a component, the component review module 280 analyzes the modified component and notifies the user if the modification causes the modified component to not satisfy a policy of the online system 101.

If a component does not satisfy a policy of the online system 101, the advertisement approval module 130 notifies the user when the non-compliance of the policy is identified and may explain what caused non-compliance. The notification is provided to the user before the advertisement is submitted, allowing the user to modify the component via the interface before submitting the advertisement. Different policies of the online system 101 may be associated with specific messages that are presented when a component is violating the policy. In one embodiment, the advertisement approval module 130 may also suggest modifications to the component to satisfy with a policy of the online system 101. If a component is determined to satisfy at least a threshold number of policies of the online system 101, the advertisement approval module 130 may provide recommendations for improving the quality or effectiveness of the component or advertisement.

In some embodiments, the online system 101 does not allow an advertiser to submit a created advertisement for final review until problems with components of the advertiser identified by during the real-time review are resolved. In other embodiments, the advertisement review module 130 determines a probability of approving an advertisement during the review of its components and prevents an advertiser from submitting an advertisement for approval until the probability is at least a threshold likelihood of approval (e.g., above 90%).

Figure 3:
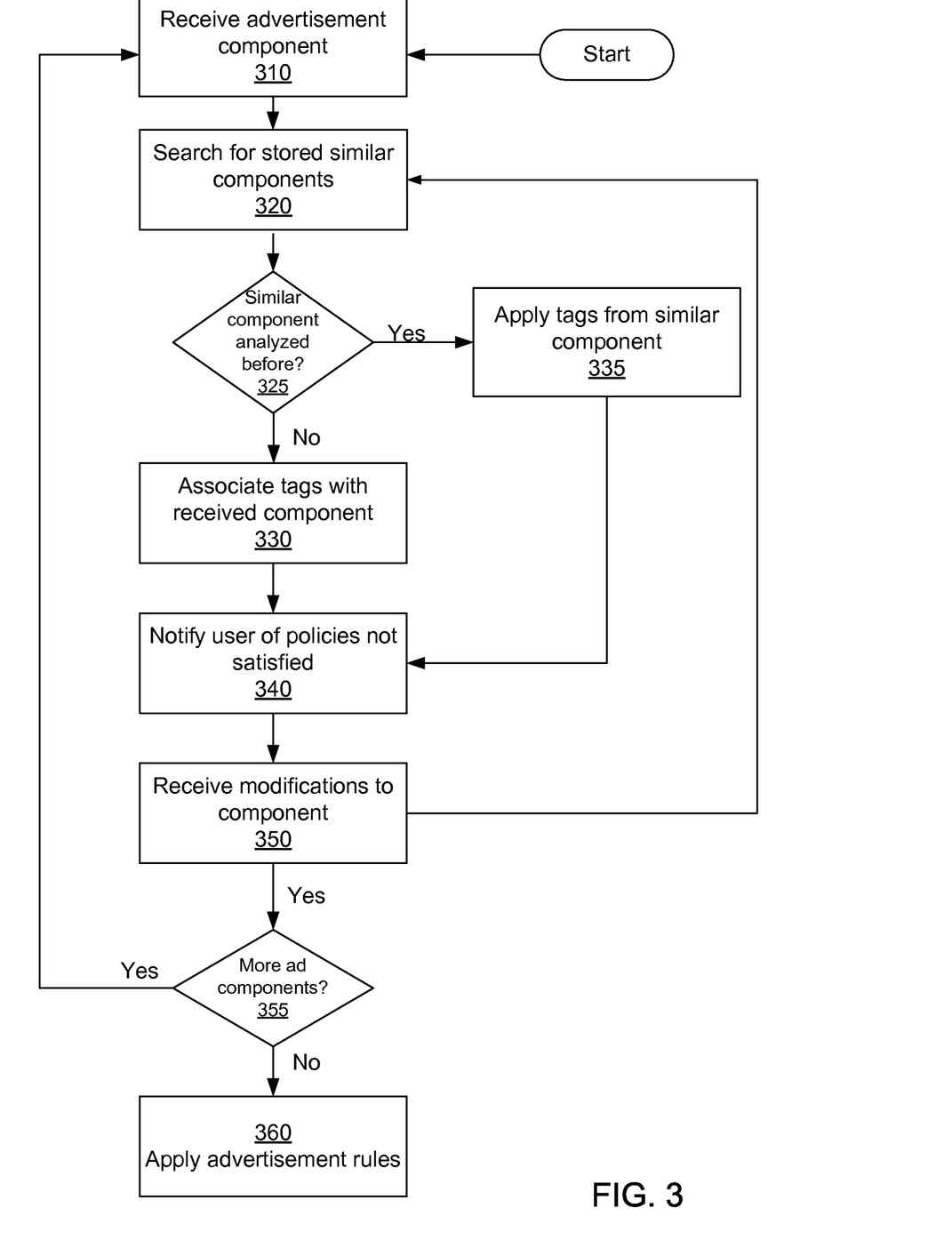
FIG. 3 is a flowchart of a process for approving advertisements in an online system, in accordance with one embodiment of the invention.

FIG. 3 shows a flowchart of a method for reviewing advertisements in an online system 101. The online system 101 receives 310 a component of an advertisement. For example, the user provides a component of an advertisement to the online system 101 via an interface. The component search module 270 searches 320 for stored components matching, or similar to, the received component previously analyzed by the online system 101. If the component search module 270 determines 325 that the ad component store 250 does not include a stored component matching, or similar to, the received component, the component review module 280 associates 330 one or more tags with the received component. As described above in conjunction with FIG. 2, the tags identify one or more characteristics, features, or attributes of the component. However, if the component search module 270 determines 325 the ad component store 250 includes a stored component matching, or similar to, the received component, tags associated with the matching, or similar component, are retrieved and applied 335 to the received component.

Based on the tags associated with the received component, the advertisement approval module 130 determines whether the component satisfies one or more policies of the online system 101 and notifies 340 the user if the component does not satisfy one or more policies. Modifications to the component may be received 350 from the user, and the component search module 270 determines 325 the ad component store 250 includes a stored component matching or similar to, the modified component and associates tags with the modified component as described above. The advertisement approval module 130 determines 355 if the advertisement includes additional components, and if additional components are included in the advertisement, the additional components are received 310 and analyzed as described above.

After receiving components comprising an advertisement, the advertisement review module 290 applies 360 one or more advertisement rules to the components of the advertisement to determine if the advertisement satisfies one or more policies of the online system 101. For example, if at least a threshold number of components of the advertisement satisfy a policy of the online system 101, the advertisement is determined to satisfy the policy of the online system 101 and the advertisement may be presented by the online system 101. As another example, if a single component of the advertisement does not satisfy the policy of the online system 101, the advertisement is determined to not satisfy the policy and is not presented.

SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
receiving, via a graphical user interface of an online system, a first portion of an advertisement from an advertiser, the advertisement comprising the first portion and a second portion, each of the first and second portions of the advertisement comprising one or more components;
identifying the one or more components of the first portion of the advertisement;
generating one or more tags describing characteristics of a component of the received first portion of the advertisement, wherein the one or more tags describing characteristics of the component are independent of the policy of the online system;
storing the generated one or more tags and data describing the component of the advertisement associated with the one or more tags;
determining, by the online system, whether the component of the received first portion of the advertisement violates one or more policies of the online system based on the generated one or more tags; and
responsive to determining, by the online system, that the component of the received first portion of the advertisement violates a policy of the online system, before receiving, by the online system via the graphical user interface, all the components of the advertisement from the advertiser including the one or more component of the second portion of the advertisement, providing the advertiser with a message in the graphical user interface that the component violates the policy of the online system.

2. The computer implemented method of claim 1, further comprising:
receiving a second advertisement from the advertiser via the graphical user interface;
identifying a plurality of components comprising the second advertisement; and
determining whether a component of the second advertisement matches stored data describing a component of the advertisement;
if the component of the second advertisement matches stored data describing the component of the advertisement, retrieving the stored one or more tags associated with the data describing the component of the advertisement;

determining whether the component of the second advertisement violates one or more policies of the online system based on the stored one or more tags associated with the data describing the component of the advertisement; and responsive to determining that the component of the second advertisement violates at least one policy of the online system, before receiving a submission of the second advertisement from the advertiser, providing the advertiser with a message in the graphical user interface that the component of the second advertisement violates at least one policy of the online system.

3. The computer implemented method of claim 1, further comprising:

receiving a modification to the component of the advertisement that violates the policy of the online system;

determining whether the modification to the component matches stored data describing one or more components of additional advertisements;

if the modification to the component matches stored data describing a component of an additional advertisement, retrieving stored one or more tags associated with the stored data describing the component of the additional advertisement; and determining whether the modification to the component violates at least one policy of the online system based on the stored one or more tags associated with the stored data describing the component of the additional advertisement; and responsive to determining that the stored data describing the component of the additional advertisement violates at least one policy of the online system, before receiving a submission of the advertisement from the advertiser, providing the advertiser with a message in the graphical user interface that the modification to the component violates at least one policy of the online system.

4. The computer implemented method of claim 1 wherein the message includes a recommended modification to the component.

5. The computer implemented method of claim 1 wherein the message identifies the policy of the online system violated by the component.

6. The computer implemented method of claim 1, wherein a component comprising the advertisement is selected from a group consisting of: a title, a body, an image, a landing page, and any combination thereof.

7. The computer implemented method of claim 1 wherein determining whether one or more of the submitted components violates one or more policies of the online system based on the generated one or more tags comprises:

determining if at least a threshold number of the generated tags describing the component are included on a blacklist.

8. A computer implemented method comprising:

receiving, via a graphical user interface of an online system, a first portion of an advertisement from an advertiser, the advertisement comprising the first portion and a second portion, each of the first and second portions of the advertisement comprising one or more components;

identifying the one or more components of the first portion of the advertisement received from the advertiser;

determining, by the online system, whether the components of the received first portion of the advertisement violates one or more policies of the online system; and responsive to determining, by the online system, that the component of the received first portion of the advertisement violates one or more policies of the online system, before receiving, by the online system via the graphical user interface, all the components of the advertisement from the advertiser including the one or more component of the second portion of the advertisement, providing the advertiser with a message in the graphical user interface that the component violating the one or more policies of the online system.

9. The computer implemented method of claim 8, wherein determining whether one or more of the submitted components violates one or more policies of the online system comprises:

determining if data describing a stored component matches a submitted component; and determining whether the stored component violates one or more policies of the online system if the data describing the stored component matches the submitted component.

10. The computer implemented method of claim 8 wherein the message includes a recommended modification to the component.

11. The computer implemented method of claim 8 wherein the message identifies a policy of the online system that the component does not satisfy.

12. The computer implemented method of claim 8, wherein a component comprising the advertisement is selected from a group consisting of: a title, a body, an image, a landing page, and any combination thereof.

13. The computer implemented method of claim 8, further comprising:

receiving a modification to the component of the submitted advertisement that violates the policy of the online system;

determining whether the modification to the component matches stored data describing one or more components of additional advertisements;

if the modification to the component matches stored data describing a component of an additional advertisement, determining whether the modification to the component satisfies one or more policies of the online system based on whether the stored data describing one or more components of additional advertisements violates at least one policy of the online system; and responsive to determining that the stored data describing one or more components of additional advertisements violates at least one policy of the online system, before receiving a submission of the advertisement from the advertiser, providing the advertiser with a message in the graphical user interface that the modification to the component violates at least one policy of the online system.

14. The computer implemented method of claim 8, further comprising:

receiving an additional advertisement from the advertiser via the graphical user interface;

identifying a plurality of components of the additional advertisement; and determining a component of the additional advertisement matches stored data describing one or more components of the advertisement;

if the component of the additional advertisement matches stored data describing one or more components of the advertisement, determining whether the stored data describing one or more components of the advertisement matching the component of the additional advertisement violates at least one policy of the online system;

responsive to determining that the stored data describing one or more components of the advertisement matching the component of the additional advertisement violates at least on policy of the online system, before receiving a submission of the additional advertisement from the advertiser, providing the advertiser with a message in the graphical user interface that the component of the additional advertisement violates at least one policy of the online system;

if the component of the additional advertisement does not match stored data describing one or more components of the advertisement, determining whether the component of the additional advertisement violates at least one policy of the online system and responsive to determining that the component of the additional advertisement violates at least on policy of the online system, before receiving a submission of the additional advertisement from the advertiser, providing the advertiser with a message in the graphical user interface that the component of the additional advertisement violates at least one policy of the online system.

15. The method of claim 1, wherein the determination of whether the component violates one or more policies of the online system is performed in real time as the advertiser is providing the advertisement to the online system via the graphical user interface.

16. The method of claim 1, wherein the determination of whether the component violates one or more policies of the online system is performed before the advertiser submits the advertisement for review to the online system.

17. The method of claim 1, wherein components of the first portion of the advertisement have a first subset of types, and components of the second portion of the advertisement have a second subset of types, different than the first subset of types.

* * * * *

UNITED STATES PATENT AND TRADEMARK OFFICE
CERTIFICATE OF CORRECTION

| | |
|---|---|
| PATENT NO. | : 11,132,719 B2 |
| APPLICATION NO. | : 13/756360 |
| DATED | : September 28, 2021 |
| INVENTOR(S) | : Mathew Varghese |

It is certified that error appears in the above-identified patent and that said Letters Patent is hereby corrected as shown below:

On the Title Page

In Column 2, item (57), under Abstract, Line 10, delete "This" and insert -- .This --, therefor.

In the Claims

In Column 10, Claim 2, Line 59, delete "advertisement; and" and insert -- advertisement; --, therefor.

In Column 11, Claim 3, Line 24, delete "advertisement; and" and insert -- advertisement; --, therefor.

In Column 12, Claim 14, Line 60, delete "advertisement; and" and insert -- advertisement; --, therefor.

In Column 13, Claim 14, Line 7, delete "on policy" and insert -- one policy --, therefor.

In Column 13, Claim 14, Line 17, delete "system and" and insert -- system; and --, therefor.

In Column 13, Claim 14, Line 19, delete "on policy" and insert -- one policy --, therefor.

Signed and Sealed this
Twenty-sixth Day of July, 2022

*Katherine Kelly Vidal*
Katherine Kelly Vidal
*Director of the United States Patent and Trademark Office*